UNITED STATES PATENT OFFICE.

SAMUEL KNOPF, OF VIENNA, AUSTRIA-HUNGARY.

PROCESS OF MAKING ARTIFICIAL OINTMENT-BASES.

971,681. Specification of Letters Patent. Patented Oct. 4, 1910.

No Drawing. Original application filed February 6, 1907, Serial No. 356,006. Divided and this application filed July 21, 1909. Serial No. 508,808.

*To all whom it may concern:*

Be it known that I, SAMUEL KNOPF, a citizen of the Empire of Austria-Hungary, residing at Vienna, in the Empire of Austria-Hungary, have invented certain new and useful Improvements in the Process of Making an Artificial Ointment-Base, of which the following is a specification, this application being a division of my prior application Serial No. 356,006, filed February 6, 1907, upon which Patent No. 941,785 was granted November 30, 1909.

The present invention relates to a process for the partial saponification of oleic acid by means of an alkali in the presence of alcohol without the application of heat, whereupon by an addition of mineral oil a transparent emulsion is formed, which by being mixed with ceresin, paraffin, or common bees wax or by being diluted with water in presence of these additions can be converted into solid ointment like products.

Heretofore mineral oils have been converted into emulsions by the addition of soaps and similar emulsions have also been produced by the introduction of fats or fatty acids into mineral oil and subsequent saponification by means of alkalies. In all these latter processes, the endeavor is, at times with an addition of alcohol, to effect as complete as possible a saponification, at a high temperature, and in certain cases with pressure and a passing through of oxygen. The addition of alcohol is mostly intended merely to dilute the final product.

With the process forming the object of the present invention only a partial saponification of the oleic acid in the presence of alcohol and without the application of heat is effected. With this partially saponified mixture of oleic acid and alcohol, very large quantities of mineral oil can be reduced to an emulsion which differs essentially from all emulsions produced heretofore, as by mixing with ceresin, paraffin or wax a consistent vaseline like substance is obtained which is particularly suitable for greasing the hands for example for surgical purposes as it can be entirely washed off with cold water. And if a large quantity of water be added to this vaseline like substance a white material is obtained which has the appearance of lanolin, and can be used for many of the purposes for which lanolin is employed.

The mineral oil emulsion is produced by mixing about 40 parts of oleic acid with about 20 parts of alcohol and 8 parts of potash lye (1:1) there being no necessity to preserve a particular temperature; the mixture can be effected equally well by cold process. 150 parts to 300 parts of any suitable mineral oil from any source are then added to 100 parts of the mixture of oleic acid alcohol and alkali. If 83 parts of the undiluted emulsion be mixed with 17 parts of ceresin, paraffin or wax the vaseline like material is produced. If 50 per cent of water be added to this, the lanolin like material is produced.

The ointment bases which have been known in trade for some time are either very dear or have the disadvantage that they are not easily absorbed by the skin, and resist incorporation with various medicaments and alter by contact with them. The ointment like substances produced according to the described process represent products which are as far as possible neutral and indifferent, and which are remarkable for their extraordinary cheapness and absorbency, and at the same time, contrary to the indifferent bases mostly used in trade, can be used for all kinds of ointments.

Having thus described my invention what I claim is.

1. Process for producing substances capable of being used as bases for ointments consisting in the mixing of oleic acid with alkali in the presence of alcohol at ordinary atmospheric temperature in such proportions that only a partial saponification is produced and then adding mineral oil to the mixture in the proportions specified, and then adding ceresin to this mixture for the purpose of obtaining a vaseline like material substantially as described.

2. Process for producing substances capable of being used as bases for ointments consisting in the mixing of oleic acid with alkali in the presence of alcohol at ordinary atmospheric temperature in such proportions that only a partial saponification is produced and then adding mineral oil to the mixture in the proportions specified, and then adding ceresin to the mixture and then adding about 50% of water to this mixture for the purpose of obtaining a white material showing many of the properties of lanolin substantially as described.

In testimony whereof I hereunto affix my signature in presence of two witnesses.

SAMUEL KNOPF.

Witnesses:
 FRIEDRICH BINDER,
 ROBERT W. HEINGARTNER.